United States Patent [19]

Connor

[11] Patent Number: 4,875,692
[45] Date of Patent: Oct. 24, 1989

[54] CONICALLY-SHAPED CORRUGATED SEAL

[75] Inventor: Michael J. Connor, Wichita, Kans.

[73] Assignee: The Boeing Company, Seattle, Wash.

[21] Appl. No.: 110,431

[22] Filed: Oct. 20, 1987

[51] Int. Cl.$^4$ ............ F16J 3/04; F16J 15/52; F16L 51/02

[52] U.S. Cl. ............ 277/212 FB; 277/227; 277/235 R; 277/235 A; 285/226

[58] Field of Search ............ 277/212 FB, 235 R, 227, 277/235 A; 464/175; 403/50, 51; 74/18.2; 138/121, 174, 173; 285/226

[56] References Cited

U.S. PATENT DOCUMENTS

| | | | |
|---|---|---|---|
| 1,397,413 | 11/1921 | Evans | 464/175 X |
| 2,264,413 | 12/1941 | Siegerist | 277/187 X |
| 2,623,798 | 12/1952 | Skinner | |
| 2,755,643 | 7/1956 | Wildhaber | 464/175 |
| 2,904,356 | 9/1959 | Love | 464/175 X |
| 2,920,656 | 1/1960 | Bertolet, Jr. | 285/226 X |
| 3,047,026 | 7/1962 | Kahn | 138/121 X |
| 3,060,069 | 10/1962 | Sindars | 138/121 X |
| 3,139,115 | 6/1964 | Bawcam et al. | 138/121 |
| 3,151,894 | 10/1964 | Wilson et al. | 285/226 X |
| 3,250,138 | 5/1966 | Ernst | 277/212 FB |
| 3,368,835 | 2/1968 | Hackforth | 403/50 |
| 3,409,224 | 11/1968 | Harp et al. | 285/226 X |
| 3,550,991 | 12/1970 | Wesoloski | |
| 3,633,945 | 1/1972 | Press et al. | 285/226 |
| 3,807,195 | 4/1974 | Faulbecker | 277/212 FB |
| 3,901,518 | 8/1975 | Uchida | 277/212 FB |
| 3,908,704 | 9/1975 | Clement et al. | 138/121 |
| 3,929,165 | 12/1975 | Diebolt et al. | |
| 4,029,363 | 6/1977 | Lowe | |
| 4,570,292 | 2/1986 | Wallace | 138/121 X |

FOREIGN PATENT DOCUMENTS

| | | | |
|---|---|---|---|
| 1296900 | 6/1969 | Fed. Rep. of Germany | 138/121 |
| 1750604 | 2/1971 | Fed. Rep. of Germany | 277/212 FB |
| 2945234 | 5/1981 | Fed. Rep. of Germany | 464/175 |
| 627120 | 7/1949 | United Kingdom | 285/226 |
| 1150954 | 5/1969 | United Kingdom | 464/175 |
| 2138525 | 10/1984 | United Kingdom | 285/226 |

*Primary Examiner*—Allan N. Shoap
*Attorney, Agent, or Firm*—Finnegan, Henderson, Farabow, Garrett & Dunner

[57] ABSTRACT

A corrugated seal for connecting two relatively movable structures and for conducting fluid between the two structures. The corrugations of the seal are arranged at a sloping angle in the direction of fluid flow to prevent the accumulation of fluid in the folds of the corrugations.

13 Claims, 5 Drawing Sheets

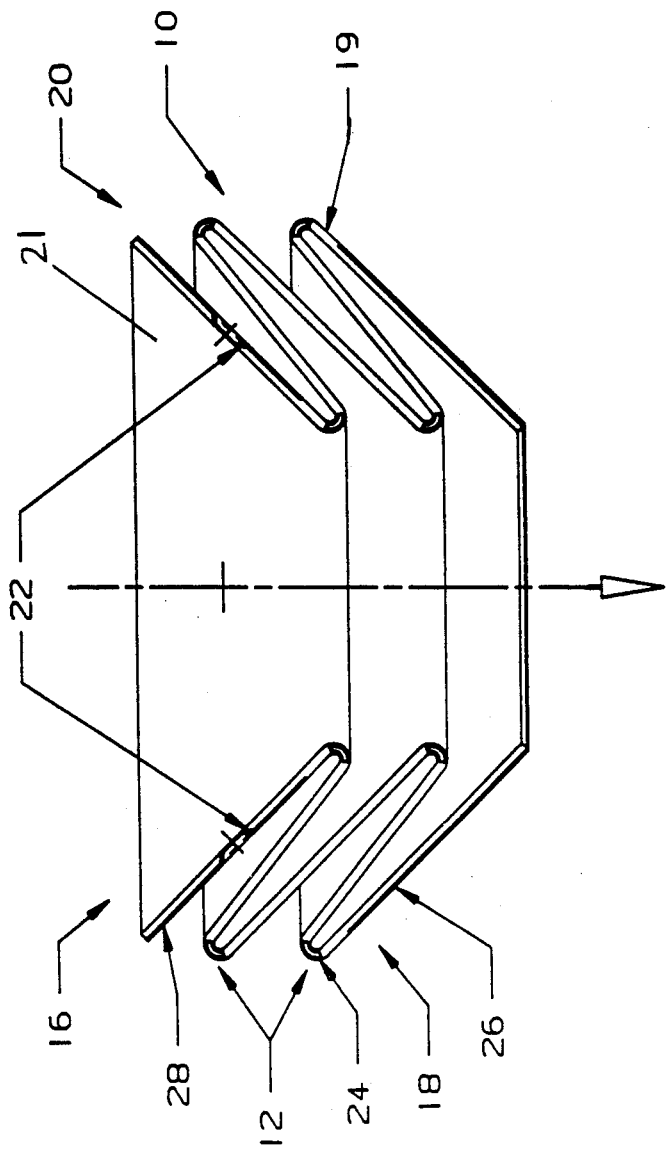

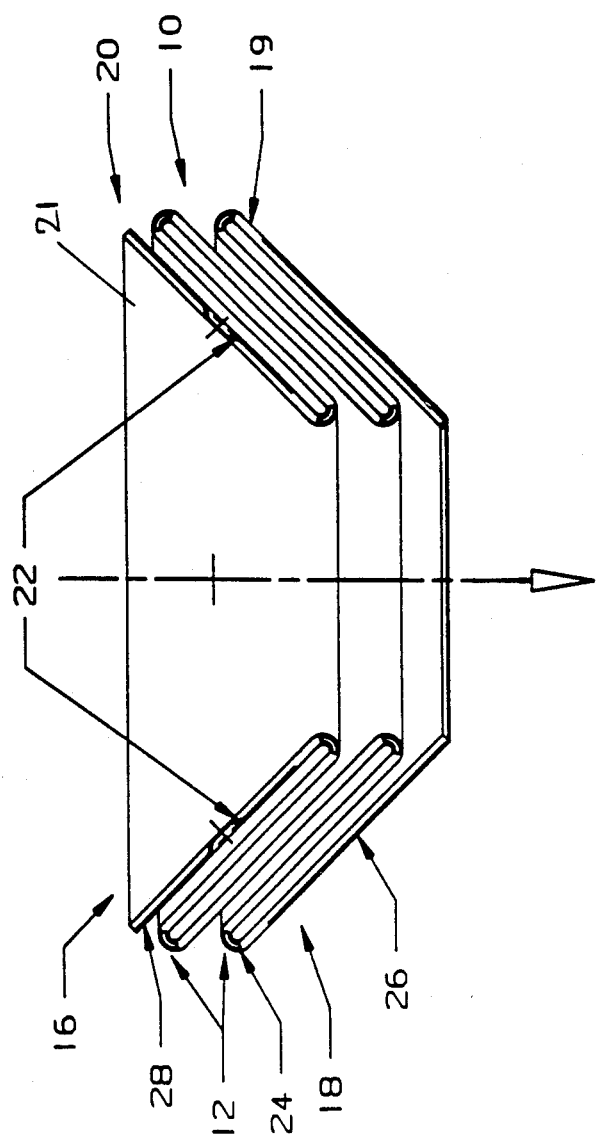

CONICALLY-SHAPED CORRUGATED SEAL

BACKGROUND OF THE INVENTION

1. Field of the Invention

The invention relates to seals, and in particular to corrugated seals for sealing two mating but not necessarily connected structures disposed for relative three-dimensional movement.

2. Description of Related Art

One problem frequently encountered in prior art seals disposed between relatively moveable structures is the ability to easily achieve and to continuously maintain sealing engagement, particularly where one sealing surface contacts but is not fixed to its corresponding structure. Another problem associated with prior art seals is the ability to withstand the stresses imposed on the seal by the fluid flowiing through the seal and by the relative motion between the structures. These problems are particularly exacerbated when the relative motion between the structures is three-dimensional.

Known corrugated seals frequently have only one fold which must absorb all relative motion and fluid stresses. Even where multiple folds are used, the folds are oriented relative to fluid flow such that fluids tend to accumulate in the folds. The accumulated fluid deteriorates the seals at the highest stres points, e.g., the folds, and reduces the flexibility of the seal.

The end surfaces of known corrugated seals generally engage the opposing structures in parallel planes arranged perpendicular to the axis of the seal. This arrangement presents problelms in properly aligning the seal with the structure during assembly or reassembly after maintenance. Moreover, this arrangement permits misalignment to occur during use, particularly where the seal is used between structures that are relatively moveable in three dimensions.

The subject invention overcomes the problems and disadvantages of the prior art by providing a conically-shaped reinforced seal having a plurality of angled folds. The seal is self-aligning with respet to the two structures it connects and is reinforced at the fold portions and at the portions of the seal which engage the two structures.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

SUMMARY OF THE INVENTION

In accordance with the purposes of the invention, as embodied and broadly described herein, the invention comprises a seal for connecting first and second relatively moveable structures and for conducting fluid from a second structure to a first structure, the seal including a continuous wall having first and second opposed ends and defining an axial conduit, the wall being corrugated axially to define a plurality of circumferential folds, the corrugations being disposed at an angle to the axis of the conduit and defining at the first end a frusto-conical exterior surface and at the second end a frusto-conical interior surface, the angle of the corrugations sloping toward the first end.

The invention resides in the novel parts, constructions, arrangements, combinations and improvements shown and described. The accompanying drawings, which are incorporated in and constitute a part of the specification, illustrate the presently preferred embodiment of the invention and, together with the description, serve to explain the principles of the invention.

BRIEF DESCRIPTION OF THE DRAWINGS

FIG. 2A is a view similar to the view shown in FIG. 2 and shows the seal of the invention in a normal condition (not stretched or compressed) and not attached to the two structures.

FIG. 2B is a view similar to the view shown in FIG. 2 and shows the seal of the invention in a compressed condition.

DESCRIPTION OF THE PREFERRED EMBODIMENT

Figure 1:
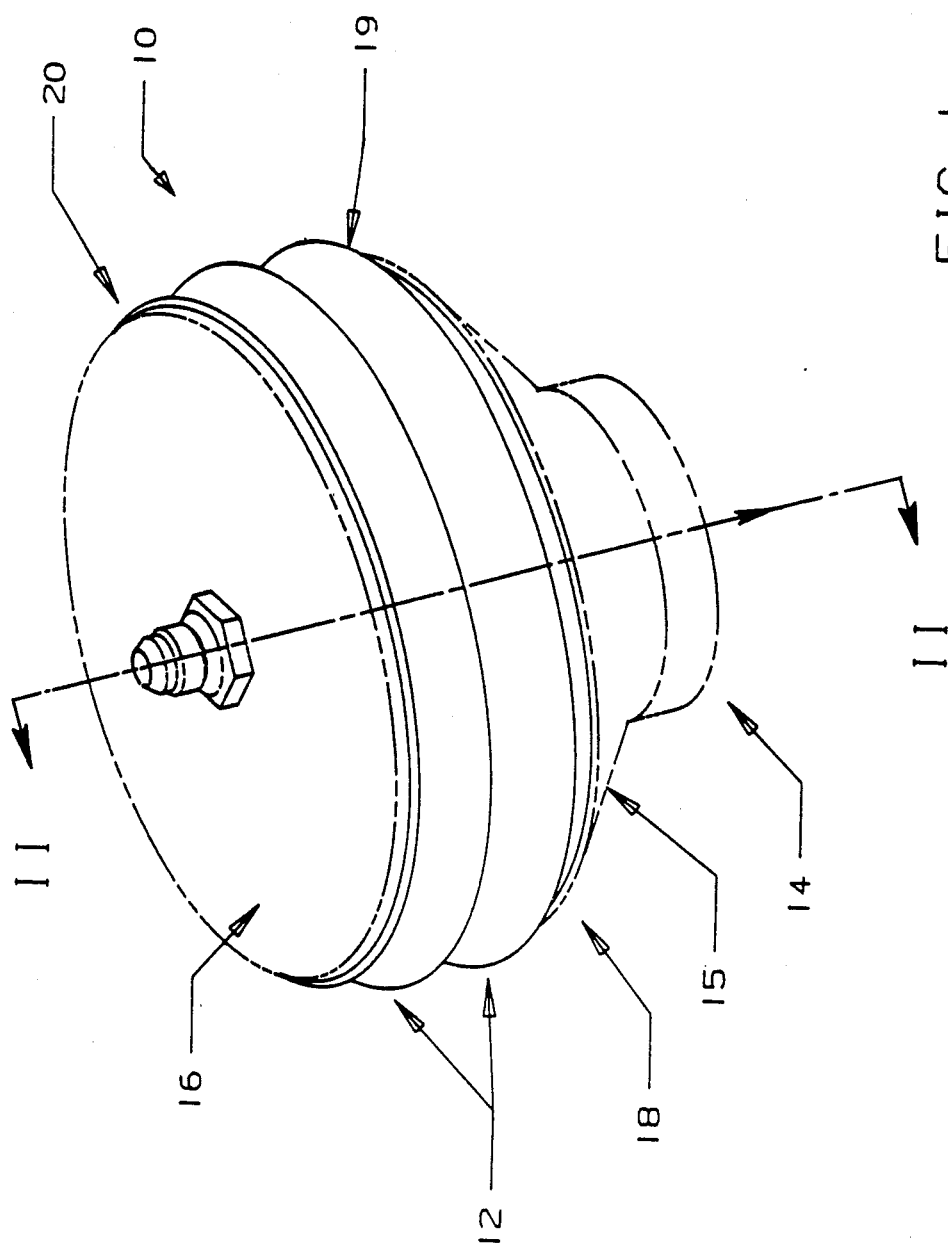
FIG. 1 is a perspective view of the seal of the invention connecting a first and second structure.

Referring to FIG. 1, a seal 10 is provided for connecting a first structure 14 and a second structure 16 that are moveable with respect to one another. In accordance with the invention, the seal includes a continuous wall having a first end 18 and na second end 20 defining an axial conduit between the first structure 14 and the second structure 16. As here embodied, the seal 10 conducts fluid from the second structure 16 to the first structure 14. Preferably, the seal material comprises alternating layers of fabric and silicone material.

In accordance with the invention, the continuous wall is corrugated in the axial direction. The corrugations define a plurality of circumferential folds 12. The corrugations are disposed at an angle to the axis of the seal, thereby defining at the first end 18 a frustro-conical exterior surface 19 and defining at the second end 20 a frustro-conical interior surface 21. As here embodied, the angle of the corrugations slopes toward the first end 18 of the seal 10. Preferably, the angle of the corrugations with respect to the direction of flow is approximately 30° to 60°.

Preferably, the frusto-conical exterior surface 19 of the first end 18 is disposed for being sealingly received in a corresponding frustro-conical element 15 ofo the first structure 14 and the frustro-conical interior surface 21 at the second end 20 is disposed for sealingly receiving a corresponding frustro-conical element 17 of the second structure 16. As embodied herein, the second end 20 of the seal 10 having a frustro-conical interior surface 21 is fixed to the frustro-conical element 17 of the second structure 16. Preferably, the second end 20 is fixed to the second structure 16 by a conventional device, such as a flat top screw 22 disposed through an aperture in the second end and an aperture in the second structure 16.

The first end 18 of the seal 10 having a frustro-conical exterior surface 19 is not fixed to the corresponding frustro-conical element 15 of the first structure 14. Instead, the first end 18 is guidingly received by the corresponding frustro-conical element 15 of the first structure 14 to form a sealing engagement between the first end 18 of the seal and the first structure 14. This form-fitting relationship between the first end of the seal and the first structure makes the seal self-aligning with respect to the first structure 14. Moreover, by this form-fitting relationship, the seal conducts fluid effectively without having to e permanently attached to both structures.

Figure 2:
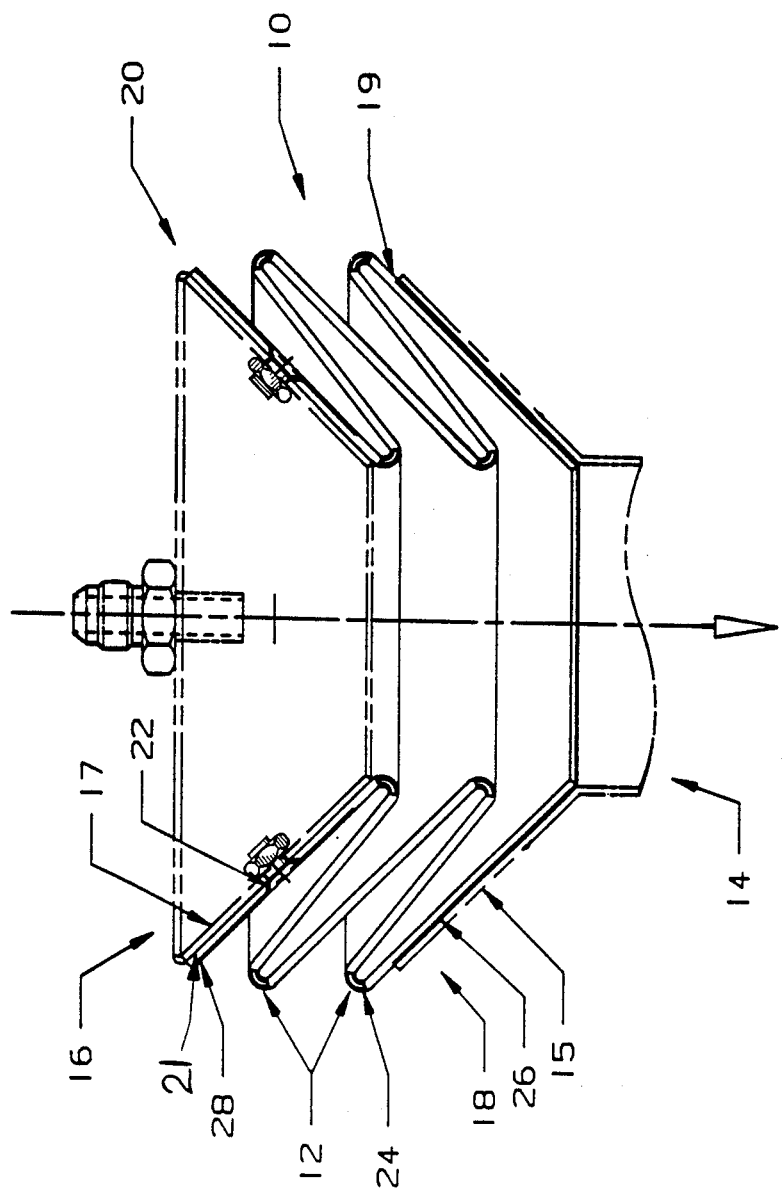
FIG. 2 is a cross-sectional view of the seal taken along line II—II of FIG. 1.

As shown in FIG. 2, a generally rigid first plate 26 is fixed to the exterior surface 19 at the first end 18 of the seal 10. This first plate 26 defines the sealing contact between the first end 18 of the seal and the corresponding frustro-conical element 15 of the first structure 14. The first plate 26 also provides a rigid surface for aligning and guiding the first end 18 of the seal into sealing engagement with the first structure 14. The first plate 26 also improves the wear characteristics of the seal. Preferably, the first plate 26 is a steel plate having a polytetrafluoroethylene coating for reducing the friction between the first plate 26 and the first structure 14 for further improving the wear characteristics of the seal. Preferably, the first plate 26 is vulcanized to the seal.

As further shown in FIG. 2, a generally rigid second plate 28 is provided at the second end 20 of the seal for reinforcing the second end of the seal. The second plate 28 is fixed to an exterior surface 29 of the seal opposing the conically-shaped interior surface 21 at the second end 20 of the seal. Preferably, the second plate 28 is a metal plate that is vulcanized to he seal. The second plate 28 creates a rigid surface at the second end 20 of the seal for supporting the fixing device, such as the screw 22, for fixing the second end 20 of the seal to the second structure 16.

As shown in FIG. 2, reinforcing members 24 are arranged at each of the folds 12 for reinforcing the folds. Preferably, the reinforcing members comprise glass fiber reinforced nylon inserts that are injection molded parts which are inserted into each of the folds as the seal is constructed.

Figure 2C:
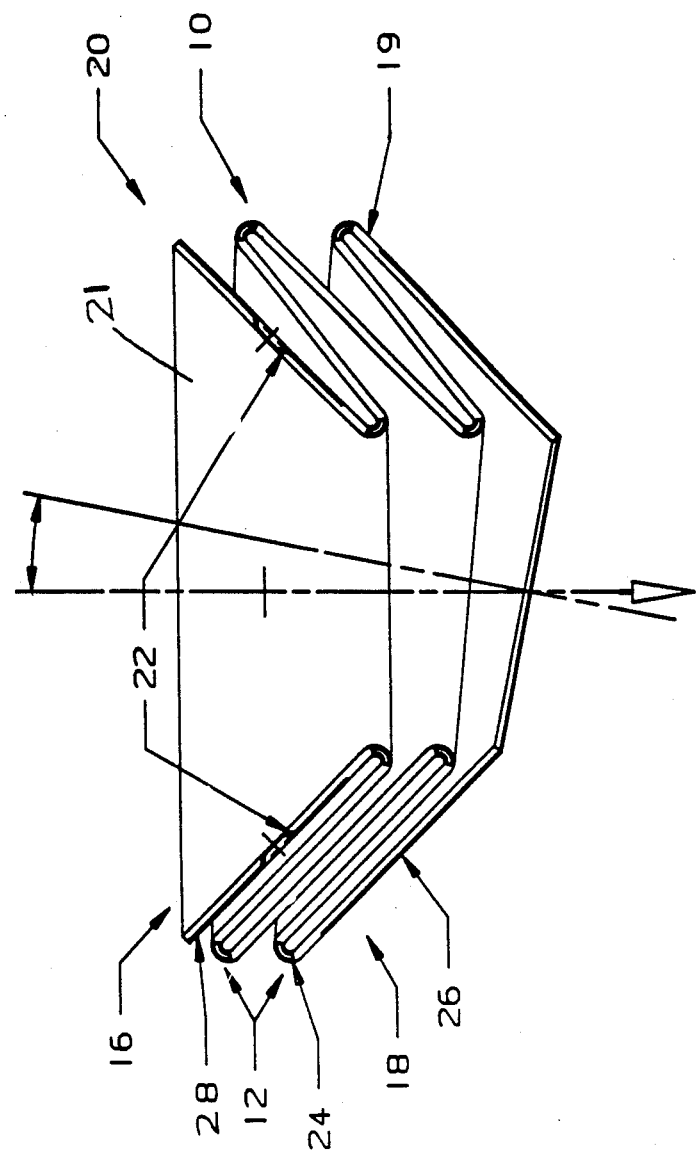
FIG. 2C is a view similar to the view shown in FIG. 2 and shows the seal of the invention in a misaligned condition.

FIGS. 2A-2C show three different conditions of the seal 10. FIG. 2A shows the normal condition of the seal, e.g., neither expanded, compressed, nor misaligned. FIG. 2B shows the seal 10 in the compressed condition. FIG. 2C shows the seal 10 in a misaligned condition. As explained above, due to its configuration, the seal 10 is self-aligning during assembly and functional even when misaligned as shown in FIG. 2C.

In operation, fluid flows from the second structure 16 to the first structure 14 through the seal 10. The angled folds 12 tend to prevent the accumulation of fluids in the fold. Moreover, the nuermous reinforcedd folds 12 improve the wear characteristics of the seal. The form-fitting relationship between the seal 10 and the first structure 14 increases the tightness and accuracy of the sealing action. In particular, the first plate 26 attached to the first end 18 of the seal 10 helps guide the frustro-conically shaped first end of the seal into tight contact with the first structure 14, thereby minimizing misalignment. For example, after maintenance is completed on the first or second structures, and the seal is arranged back in place in the seat of the first structure, the conical shape of the seal essentially guides the seal into its proper place in the seat on the first structure. The metal plate in the second end of the seal essentially reinforces the seal and permits the seal to be fixed to the second, non-moving structure.

It will be apparent on those skilled in the art that various modifications and variations can be made in the seal of the invention without departing from the scope or spirit of the invention.

What is claimed is:

1. A seal for connecting first and second relatively moveable structures and for conducting fluid from said second structure to said first structure, said seal comprising:
    a continuous wall having first and second opposed ends and defining an axial conduit, said wall being corrugated axially to define a plurality of circumferential folds, said folds being disposed at an angle to the axis of said conduit and defining at the first end a frustro-conical exterior surface adapted for sealing contact with the first structure and at the second end a frustro-conical interior surface adapted for sealing contact with the second structure, the angle of said folds sloping normally and continuously toward said first end to prevent an accumulation of the fluid in said circumferential folds as the fluid flows from said second structure to said first structure.

2. The seal of claim 1, further comprising means for reinforcing each said fold.

3. The seal of claim 1, wherein said reinforcing means comprises glass fiber reinforced nylon members installed into each of said folds.

4. The seal of claim 3, wherein the first end of said seal is sealingly received in a form-fitting manner by the frustro-conical element of said first structure and wherein the second end of said seal is fixed to the frustro-conical element of said second structure.

5. The seal of claim 4, wherein said second end further includes an exterior surface opposing said interior surface nd wherein said seal further comprises a generally rigid second plate means fixed to said exterior surface of said second end for reinforcing said second end.

6. The seal of claim 5, wherein said second plate means is a metal plate.

7. The seal of claim 5, also including screw means for fixing said second end and said second plate means to said frustro-conical element of said second structure.

8. The seal of claim 3, also including generally rigid first plate means fixed to said exterior surface for defining sealing contact between said first end and the frustro-conical element of said first structure and for guiding said first end into form-fitting sealing engagement with said first structure.

9. The seal of claim 8, wherein said first plate means is a metal plate.

10. The seal of claim 9, wherein said first plate has a polytetrafluoroethylene coating.

11. The seal of claim 1, wherein teh frustro-conical exterior surface at said first end is disposed for being sealingly received in a corresponding frustro-conical element of said first structure and the frustro-conical interior surface at said second end being disposed for sealingly receiving a corresponding frustro-conical element of said second structure.

12. A seal for connecting first and second relatively moveable structures and for conducting fluid from said second structure to said first structure, said seal comprising:
    a continuous wall having first and second opposed ends and defining an axial conduit, said wall being corrugated axially to define a plurality of circumferential folds, said folds being disposed at an angle to the axis of said conduit and defining a frustro-conical exterior surface at said first end and a frustro-conical interior surface at said second end, the angle of said folds sloping toward said first end; and means for reinforcing each of said folds, said reinforcing means including glass fiber reinforced nylon members installed in each of said folds.

13. A seal for connecting first and second relatively moveable structures and for conducting fluid from said second structure to said first structure, said seal comprising:

a continuous wall having first and second opposed ends and defining an axial conduit, said wall being corrugated axially to define a plurality of circumferential folds, said folds being disposed at an angle to the axis of said conduit and defining a frustro-conical exterior surface at said first end and a frustro-conical interior surface at said second end, the angle of said folds sloping toward said first end, wherein the frustro-conical exterior surface at said first end is disposed for being sealingly received in a corresponding frustro-conical element of said first structure and wherein the frustro-conical interior surface at said second end is disposed for sealingly receiving a corresponding frustro-conical element of said second structure; and first plate means fixed to the exterior surface of said first end for defining sealing contact between said first end and the frustro-conical element of said first structure and for guiding said first end into sealing engagement with said first structure, said first plate means including a metal plate having a polytetrafluoroethylene coating.

* * * * *

UNITED STATES PATENT AND TRADEMARK OFFICE
CERTIFICATE OF CORRECTION

PATENT NO. : 4,875,692

DATED : October 24, 1989

INVENTOR(S) : MICHAEL J. CONNOR

It is certified that error appears in the above-identified patent and that said Letters Patent is hereby corrected as shown below:

IN THE SPECIFICATION:

Column 2, line 29, change "na" to --a--;
        line 49, change "ofo" to --of--.

Column 3, line 4, change "e" to --be--;
        line 26, change "he" to --the--;
        line 48, change "nuermous" to --numerous--;
                change "reinforcedd" to --reinforced--; and
        line 64, change "on" to --to--.

UNITED STATES PATENT AND TRADEMARK OFFICE
CERTIFICATE OF CORRECTION

PATENT NO. : 4,875,692

DATED : October 24, 1989

INVENTOR(S) : Michael J. Connor

It is certified that error appears in the above-identified patent and that said Letters Patent is hereby corrected as shown below:

IN THE CLAIMS:

Column 4, line 31, change "nd" to --and--.

Column 4, line 49, change "teh" to --the--.

Signed and Sealed this

Ninth Day of October, 1990

Attest:

HARRY F. MANBECK, JR.

*Attesting Officer*  *Commissioner of Patents and Trademarks*